US012801268B2

(12) United States Patent
Sasanuma et al.

(10) Patent No.: US 12,801,268 B2
(45) Date of Patent: Nov. 17, 2026

(54) DISPLAY CONTROL DEVICE AND DISPLAY CONTROL METHOD

(71) Applicant: Nissan Motor Co., Ltd., Yokohama (JP)

(72) Inventors: Yasutomo Sasanuma, Kanagawa (JP); Jun Ueda, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 139 days.

(21) Appl. No.: 18/561,790

(22) PCT Filed: May 28, 2021

(86) PCT No.: PCT/JP2021/020488

§ 371 (c)(1),
(2) Date: Nov. 17, 2023

(87) PCT Pub. No.: WO2022/249473

PCT Pub. Date: Dec. 1, 2022

(65) Prior Publication Data

US 2024/0241630 A1 Jul. 18, 2024

(51) Int. Cl.

*G06F 3/04845* (2022.01)
*G06F 3/04817* (2022.01)
*G06T 3/40* (2006.01)

(52) U.S. Cl.

CPC ...... *G06F 3/04845* (2013.01); *G06F 3/04817* (2013.01); *G06T 3/40* (2013.01)

(58) Field of Classification Search

CPC .... G06F 3/04845; G06F 3/04817; G06T 3/40
See application file for complete search history.

(56) References Cited

U.S. PATENT DOCUMENTS 7,724,242 B2 * 5/2010 Hillis .................. G06F 3/04845 345/173
8,295,638 B2 10/2012 Tsuda et al.
(Continued)

FOREIGN PATENT DOCUMENTS

GB 2 360 500 A 9/2001
JP 2011-103028 A 5/2011
(Continued)

OTHER PUBLICATIONS

Extended European Search Report of Jul. 2, 2024 of corresponding European Patent Application No. 21942158.3.
(Continued)

*Primary Examiner* — Charles Tseng
(74) *Attorney, Agent, or Firm* — Spencer Fane LLP

(57) ABSTRACT

A display control apparatus includes a display having a plurality of buttons arranged on a side, and a controller that controls images displayed on the display. Upon detecting an operation of a first button by a user, the controller causes a transition to a first image from a second image. The first image is associated with the first button and is different from the second image. The second image is associated with a second button that had been displayed on the display before the operation was performed. The controller executes a rendering process during the transition. Rendering processes include appearance rendering, in which the first image is moved to a center of the display from a direction of a position of the first button, and disappearance rendering, in which the second image is cleared from the display. The appearance rendering is executed after the disappearance rendering.

17 Claims, 9 Drawing Sheets

(56) References Cited

U.S. PATENT DOCUMENTS

| | | | | |
|---|---|---|---|---|
| 9,417,087 | B1 * | 8/2016 | Nguyen Kim | G01C 21/3664 |
| 10,169,902 | B2 * | 1/2019 | Benario | G06T 13/20 |
| 10,761,691 | B2 | 9/2020 | Anzures et al. | |
| 2004/0100479 | A1 * | 5/2004 | Nakano | G06F 3/0485<br>715/700 |
| 2014/0075374 | A1 | 3/2014 | Jitkoff et al. | |
| 2019/0215882 | A1 * | 7/2019 | Kim | G06F 3/147 |

FOREIGN PATENT DOCUMENTS

| | | | |
|---|---|---|---|
| JP | 2012-231444 | A | 11/2012 |
| WO | 2014/039157 | A1 | 3/2014 |

OTHER PUBLICATIONS

The Indian Office Action for the corresponding Indian Patent Application No. 202347089229 issued on Jul. 21, 2026.

* cited by examiner

DISPLAY CONTROL DEVICE AND DISPLAY CONTROL METHOD

CROSS-REFERENCE TO RELATED APPLICATIONS

This application is a U.S. national stage application of International Application No. PCT/JP2021/020488, filed on May 28, 2021.

BACKGROUND

Technical Field

The present invention relates to a display control apparatus and a display control method.

Background Information

Inventions involving switching displayed content (images) by touching an icon displayed on an electronic device are known in International Publication No. 2014/039157 (Patent Citation 1).

SUMMARY

However, no mention is made in the invention disclosed in Patent Citation 1 of a rendering used when images are switched. Thus, there is a risk that a user will not notice that the images have been switched.

The present invention was devised in view of the foregoing problem, it being an object of the invention to provide a display control apparatus and a display control method with which a user can be made to notice that images have been switched.

In a display control apparatus according to one aspect of the present invention, when it has been detected that a first button has been operated by a user, the display control apparatus causes a transition from a second image, which had been displayed on a display before the operation was performed, to a first image, which is associated with the first button and is different from the second image, and executes a rendering process during the transition.

According to the present invention, it is possible to make a user notice that images have been switched.

BRIEF DESCRIPTION OF THE DRAWINGS

Referring now to the attached drawings which form a part of this original disclosure.

DETAILED DESCRIPTION OF EMBODIMENTS

An embodiment of the invention is described below with reference to the drawings. The same symbols are given to the same parts of the drawings and descriptions thereof are omitted.

Figure 1:
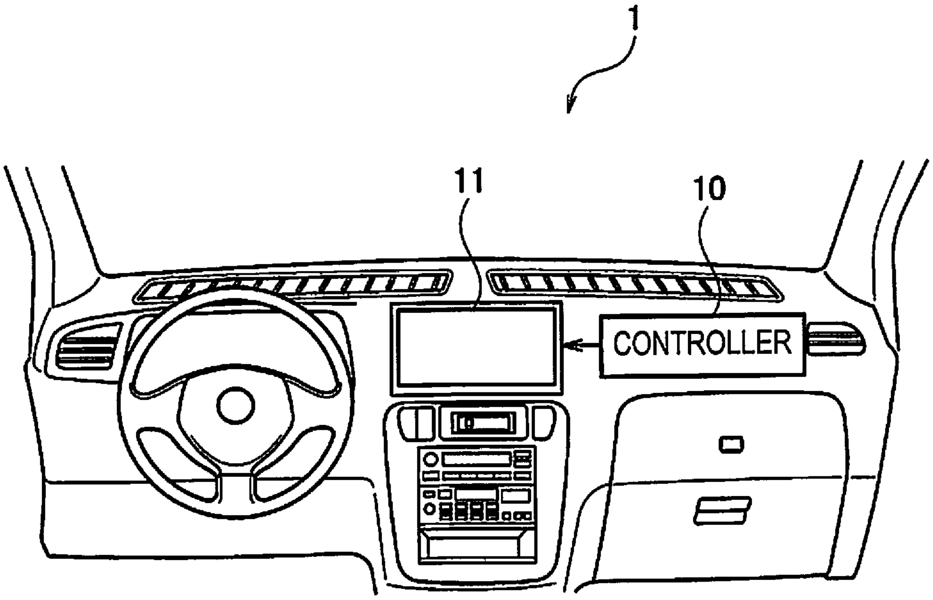
FIG. 1 is a configuration drawing of a display control apparatus 1 according to an embodiment of the present invention.

A configuration example of a display control apparatus 1 shall be described with reference to FIG. 1. The display control apparatus 1 is installed inside a vehicle. The display control apparatus 1 includes a controller 10 and a display 11 as shown in FIG. 1. The display 11 is a touch panel that can be operated by touch. In the present embodiment, a steering wheel is described as being installed on the left side, but such an arrangement is not provided by way of limitation. The steering wheel may be installed on the right side.

The controller 10 controls images displayed on the display 11. The controller 10 is a general-purpose microcomputer provided with a central processing unit (CPU), memory, and an input/output unit. Computer programs for causing the microcomputer to function as the display control apparatus 1 are installed in the microcomputer. Due to the computer programs being executed, the microcomputer functions as a plurality of information processing circuits provided to the display control apparatus 1. In the present example, a plurality of information processing circuits provided to the display control apparatus 1 are realized using software, but as shall be apparent, it is also possible to configure information processing circuits by preparing dedicated hardware for executing the information processes described below. The plurality of information processing circuits may also be configured using individual hardware.

Figure 2:
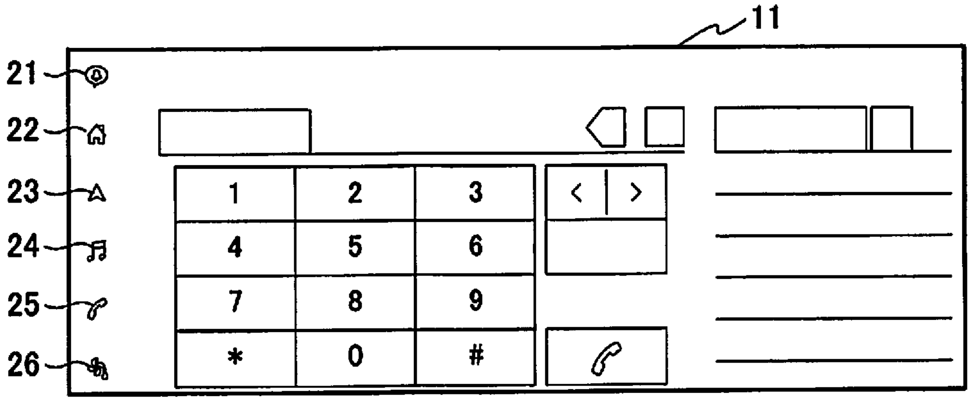
FIG. 2 is a diagram for describing one example of an image displayed on a display 11.

An example of an image displayed on the display 11 shall next be described with reference to FIG. 2. Six icons (21 to 26) are displayed at the left end of the display 11 as shown in FIG. 2. The icons 21 to 26 are virtual icons displayed on the display 11. The icons 21 to 26 may also be mechanical buttons. Applications associated with the icons 21 to 26 are launched by a user touching the icons 21 to 26. The application associated with icon 21 is "notifications." The application associated with icon 22 is "home." The application associated with icon 23 is "route guidance." The application associated with icon 24 is "music." The application associated with icon 25 is "phone." The application associated with icon 26 is "air conditioning (HVAC: heating, ventilation, and air conditioning)." The image in FIG. 2 shows that the user has touched icon 25 and the phone application has been launched.

Figure 11:
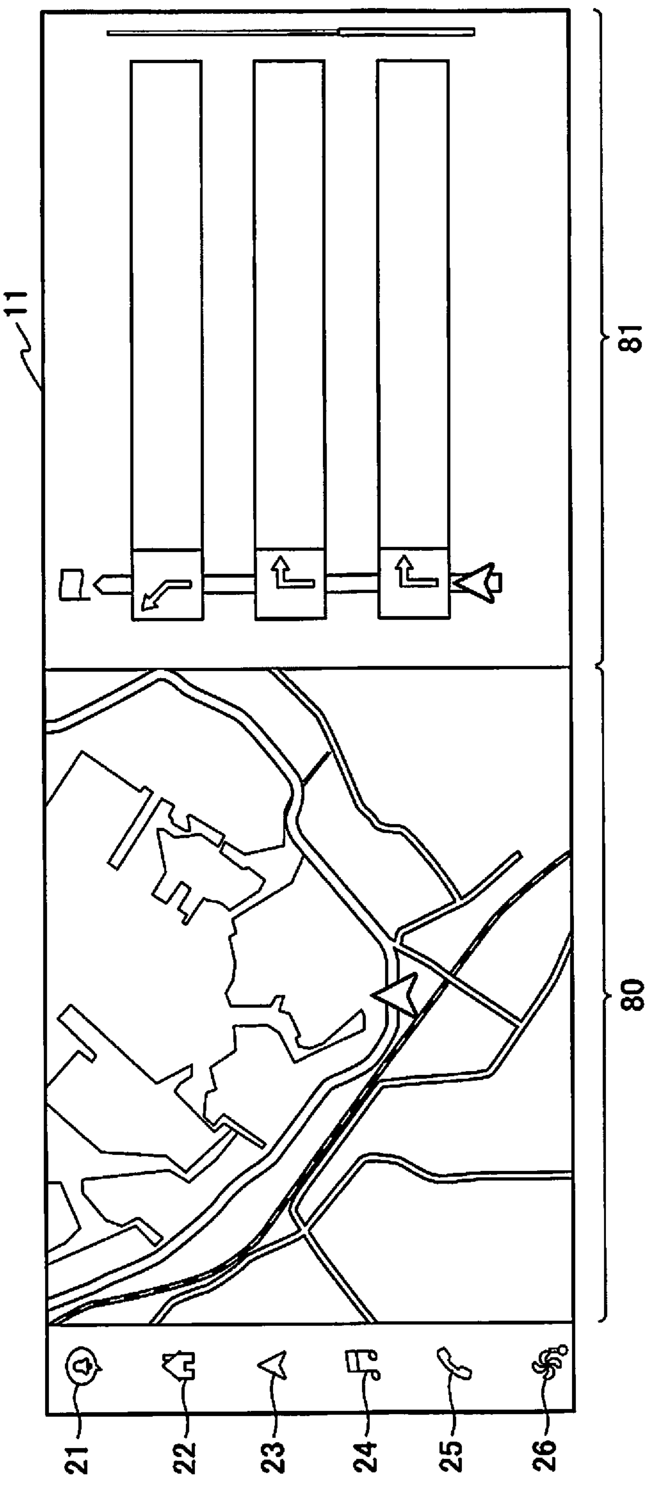
FIG. 11 is a diagram for describing a rendering process method.

A method of moving images of applications associated with icons 21 to 26 shall next be described with reference to FIGS. 3 to 5. Hereinafter, "image of the application associated with the icon" is expressed simply as "image associated with the icon." The image associated with icon 21 is an image of notifications for the user. An image of notifications for the user is omitted. The image associated with icon 22 is an image of a home screen. An example of an image of a home screen is shown in T=6 of FIG. 5. The image associated with icon 23 is an image of route guidance. An example of an image of route guidance is shown in FIG. 11. The image associated with icon 24 is an image of music. An image of music is omitted. The image associated with icon 25 is an image of a phone keypad. An example of an image of a phone keypad is shown in FIG. 2. The image associated with icon 26 is an image of air conditioning. An image of air conditioning is omitted.

Figure 3:
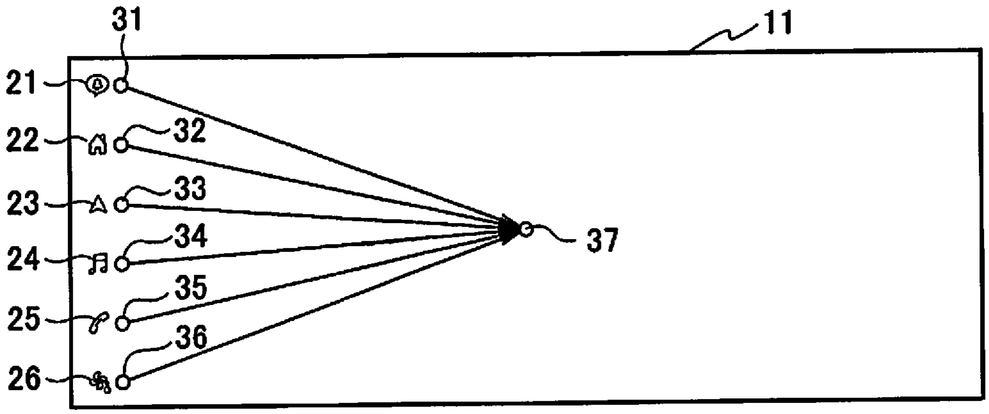
FIG. 3 is a diagram for describing a method of moving images associated with icons 21 to 26.

Symbols 31 and 37 in FIG. 3 indicate directions in which the image associated with icon 21 moves. That is, when the user touches icon 21, the image associated with icon 21 moves toward the center (symbol 37) of the display 11 from the direction (symbol 31) of the position of icon 21. Similarly, symbols 32 and 37 in FIG. 3 indicate directions in which the image associated with icon 22 transitions. When the user touches icon 22, the image associated with icon 22 moves toward the center (symbol 37) of the display 11 from the direction (symbol 32) of the position of icon 22. The same applies to symbols 33 to 36, and descriptions thereof are omitted. The center of the display 11 in the present embodiment literally means the middle of the display 11. However, this interpretation is not provided by way of limitation. For example, the display 11 could also be horizontally wider than the normal display used in navigation apparatuses. A corresponding case would be one in which a normal display used in navigation apparatuses and a meter display are integrated and used as one display. When such a "horizontally long display" is used, it is also conceivable to divide the display area into left and right halves and apply the present invention only to the left half display area. In this case, the image associated with icon 22 moves toward the "center of the left half display area" from the direction of the position of icon 22. Therefore, the "center of the display" may be defined as the position where a first image (described hereinafter) is to be displayed on the display. The "center of the display" may also be defined as a position coinciding with the center of the first image when the first image is displayed in a normal state. "When the first image is displayed in a normal state" refers to a case in which the first image is displayed over the entire screen.

Figure 4:
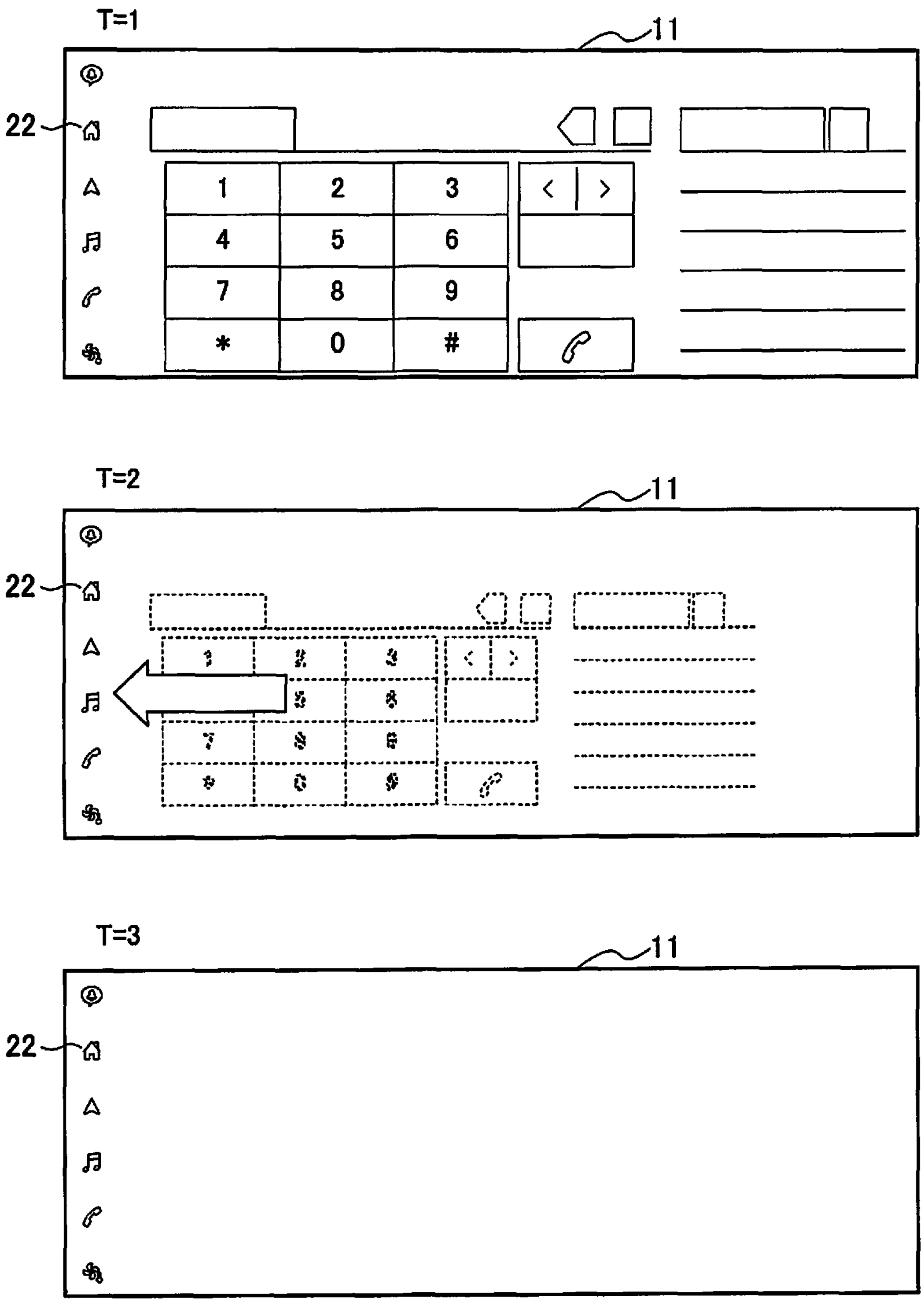
FIG. 4 is a diagram for describing a method of moving images associated with icons 21 to 26.
Figure 5:
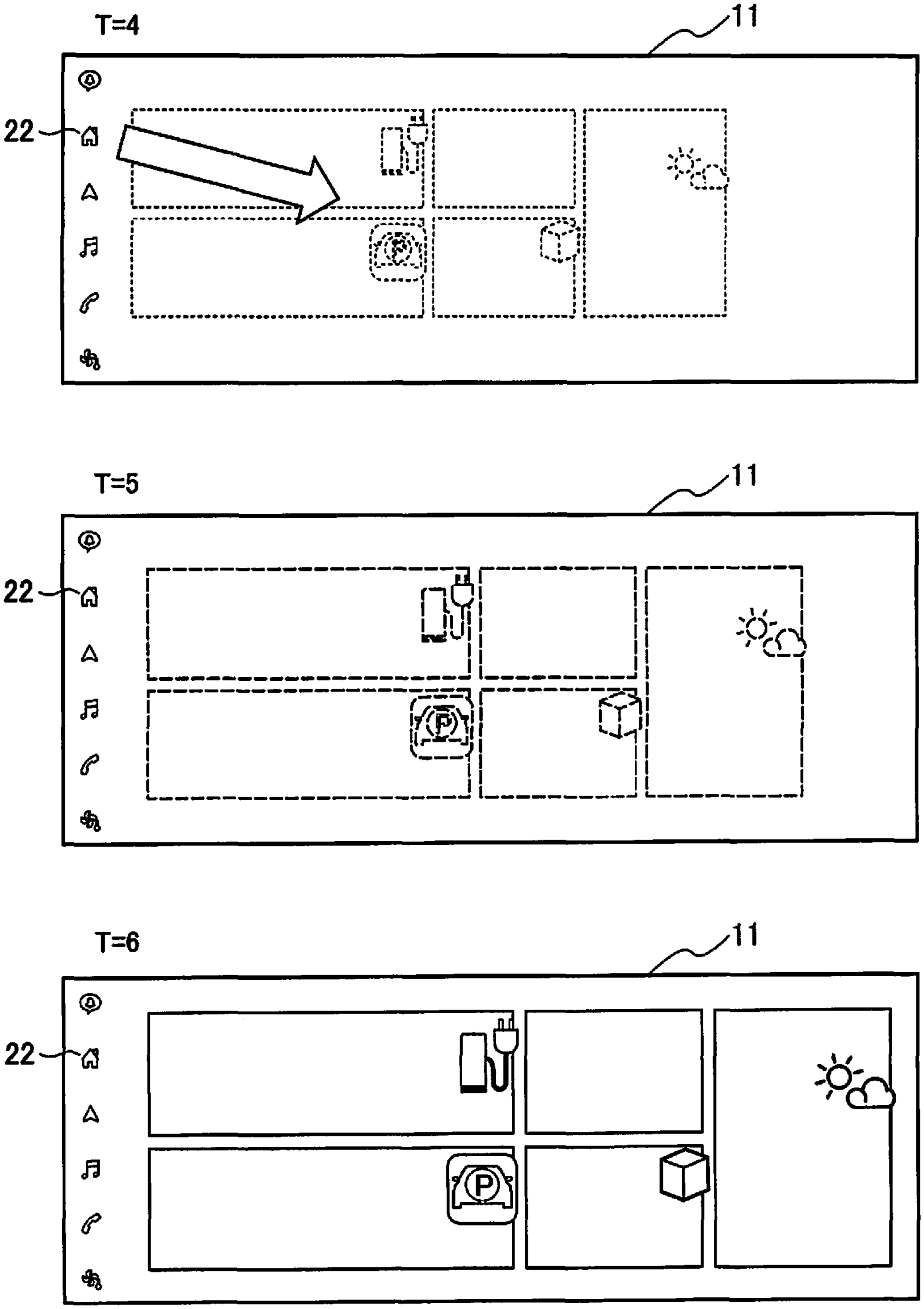
FIG. 5 is a diagram for describing a method of moving images associated with icons 21 to 26.

T=1 to T=6 in FIGS. 4 and 5 show an image transitioning in the stated order. The drawing shown by T=1 shows an image of a phone keypad displayed on the display 11. In T=1, the user has touched icon 22. The controller 10 detects that icon 22 has been operated by the user. "Icon 22 has been operated by the user" means that the user has touched icon 22. Methods of detecting touch panel operation are well known and are known to incorporate resistive film formats, capacitive formats, and the like.

When the controller 10 has detected that icon 22 has been operated by the user, the controller 10 clears the image of the phone keypad from the display as shown in T=2. Specifically, the controller 10 gradually reduces and gradually lightens the image of the phone keypad, fading out the image from the display 11 as shown in T=2. The fade-out direction is toward the location of the user. The user mentioned here is the driver sitting in the driver seat. Thus, the fade-out direction is leftward, as shown in T=2. Clearing the image (of the phone keypad) that had been displayed on the display 11 before the operation by the user (touching icon 22) is performed is referred to as "disappearance rendering." When the steering wheel is installed on the right side, the fade-out direction is rightward.

The drawing shown by T=3 shows that the image of the phone keypad has been completely cleared from the display 11. After having completely cleared the image of the phone keypad from the display 11, the controller 10 causes an image of the home screen to appear. Specifically, the controller 10 causes an image of the home screen to appear from the direction of the position of icon 22 as shown in T=4. The controller 10 gradually increases the size and density of the image of the home screen, causing the image to fade in to the center of the display 11 as shown in T=4 to T=6. Causing an image (of the home screen) relating to a user operation (touching icon 22) to appear in the display 11 is referred to as "appearance rendering." The processes of the controller 10 relating to "disappearance rendering" and "appearance rendering" are referred to as "rendering processes." The image of the home screen is an image in which information relating to charging, information relating to parking, information relating to the weather, and other such information are displayed as shown in FIG. 5.

Figure 6:
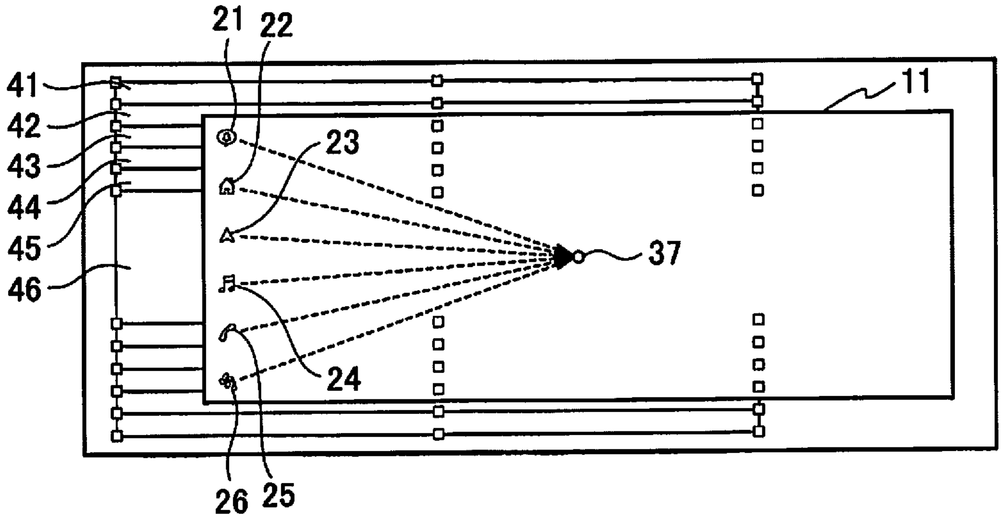
FIG. 6 is a diagram for describing a rendering process method.

An example of a rendering process method shall next be described with reference to FIGS. 6 to 8. Images 41 to 46 are prepared behind the display 11 as shown in FIG. 6. "Behind the display 11" is a conceptual expression. "Behind the display 11" does not mean behind the actual display 11. Image 41 shows notifications for the user. Image 42 shows the home screen. Image 43 shows route guidance. Image 44 shows music. Image 45 shows a phone keypad. Image 46 shows air conditioning.

Figure 7:
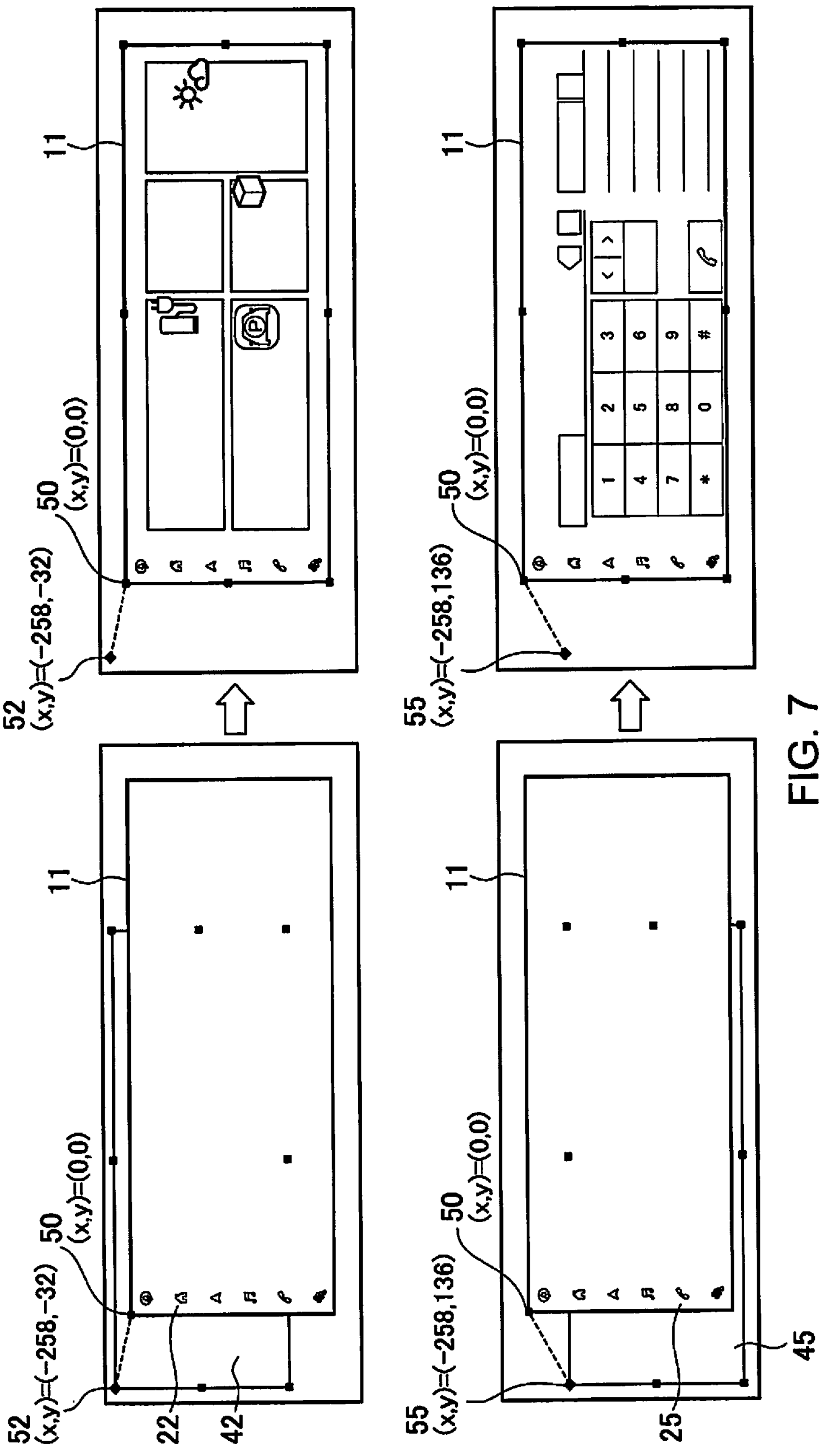
FIG. 7 is a diagram for describing a rendering process method.

FIG. 7 shows an example of an appearance rendering process method. Disappearance rendering is omitted in FIG. 7. The upper drawings in FIG. 7 shall first be described. The upper drawings show an appearance rendering process in a case in which it has been detected that icon 22 has been operated by the user. Symbol 52 shows upper left coordinates of image 42. The coordinates of symbol 52 are expressed as (x, y)=(−258, −32). Symbol 50 shows upper left coordinates of the display 11. The coordinates of symbol 50 are expressed as (x, y)=(0, 0). When it has been detected that icon 22 has been operated by the user, the controller 10 moves image 42 toward the center of the display 11 from the direction of the position of icon 22. "Moves image 42 toward the center of the display 11 from the direction of the position of icon 22" means that image 42 is moved so that the upper left coordinates 52 overlap coordinates 50. As a result, an image of the home screen associated with icon 22 appears from the direction of the position of icon 22 touched by the user. As a consequence thereof, it is easier for the user to predict the application that will next launch (the application that will be displayed on the display 11).

The lower drawings of FIG. 7 shall next be described. The lower drawings show an appearance rendering process in a case in which it has been detected that icon 25 has been operated by the user. Symbol 55 shows upper left coordinates of image 45. The coordinates of symbol 55 are expressed as (x, y)=(−258, 136). When it has been detected that icon 25 has been operated by the user, the controller 10 moves image 45 toward the center of the display 11 from the direction of the position of icon 25. "Moves image 45 toward the center of the display 11 from the direction of the position of icon 25" means that image 45 is moved so that the upper left coordinates 55 overlap coordinates 50.

Figure 8:
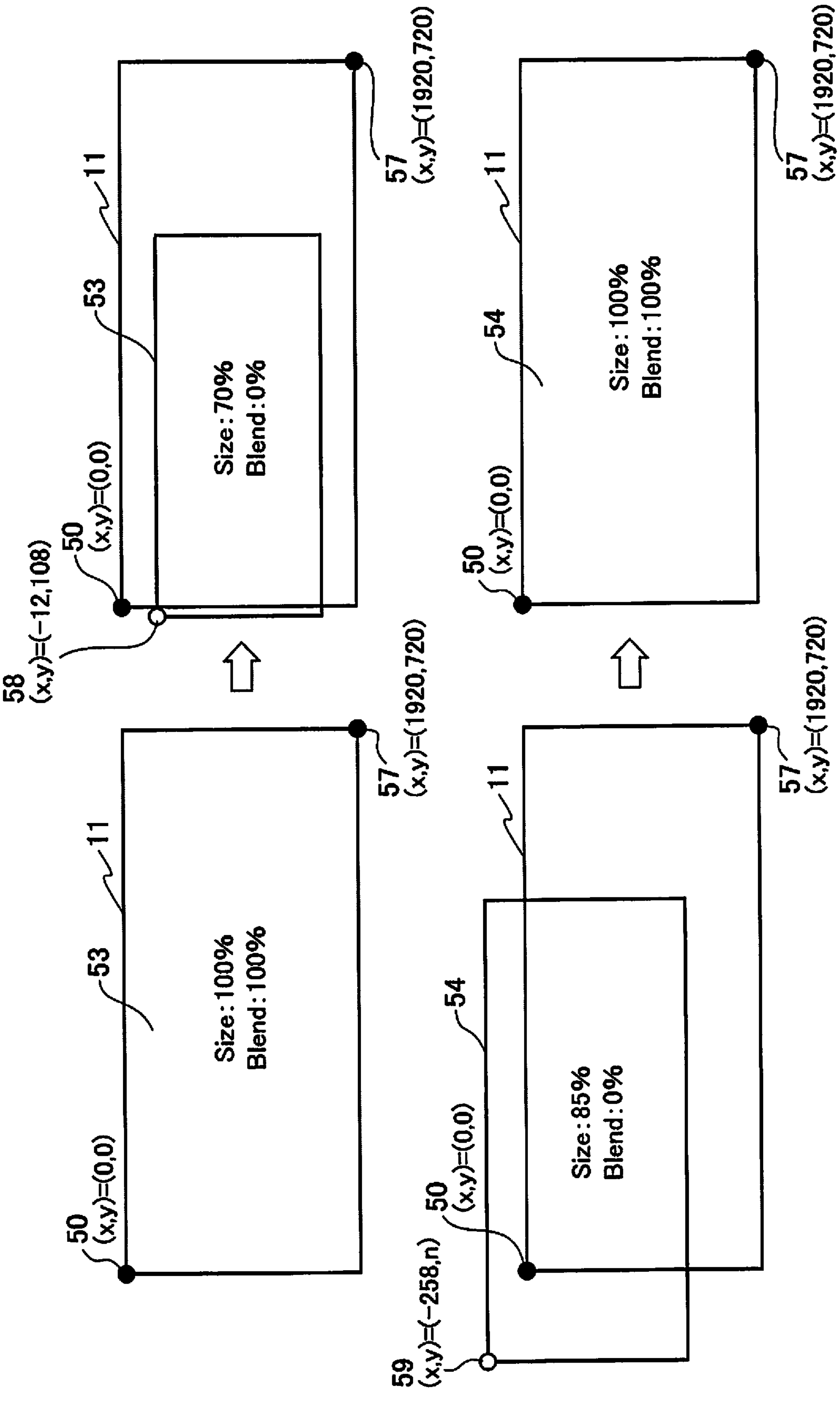
FIG. 8 is a diagram for describing a rendering process method.

The upper drawings of FIG. 8 show an example of a disappearance rendering process method. The upper drawings of FIG. 8 correspond to T=1 to T=2 of FIG. 4. A size of 100% means that the size of image 53 is 100%. In a normally displayed state, the size of image 53 is 100%. Blend 100% means that the density of image 53 is 100%. In a normally displayed state, the density of image 53 is 100%. Symbol 58 shows upper left coordinates of image 53. The coordinates of symbol 58 are expressed as (x, y)=(−12, 108). Image 53 is any image among images 41 to 46 shown in FIG. 6. When it has been detected that an icon has been operated by the user, the controller 10 clears image 53, which had been displayed on the display 11 before the user operation, from the display 11. Specifically, the controller 10 gradually reduces and gradually lightens the image, causing the image to fade out from the display 11 as shown in FIG. 8. The time needed to transition from size: 100%, blend: 100% to size: 70%, blend: 0% is, for example, 0.2 seconds.

The lower drawings of FIG. 8 show an example of an appearance rendering process method. The lower drawings of FIG. 8 are for supplementing FIG. 7. Symbol 59 shows upper left coordinates of image 54. The coordinates of symbol 58 are expressed as (x, y)=(−258, n). Image 54 is any image among images 41 to 46 shown in FIG. 6. The value of n is determined according to images 41 to 46. If image 54 is image 42, n will be −32. If image 54 is image 45, n will be 136. The controller 10 gradually increases the size and density of image 54, causing the image to fade in to the center of the display 11 as shown in FIG. 8. The time needed to transition from Size 85%, Blend 0% to Size 100%, Blend 100% is, for example, 0.6 seconds.

As described above, with the display control apparatus 1 according to the present embodiment, the following effects are obtained.

The display control apparatus 1 includes the display 11, which has a plurality of buttons disposed on the side, and the controller 10, which controls images displayed on the display 11. When it has been detected that the first button has been operated by the user, the controller 10 causes a transition from a second image that had been displayed on a display 11 before the operation to a first image associated with the first button and different from the second image. The controller 10 executes a rendering process during the transition. Rendering processes include appearance rendering, in which the first image is moved to the center of the display 11 from the direction of the position of the first button, and disappearance rendering, in which the second image is cleared from the display 11. With the display control apparatus 1, the second image associated with the previous application is cleared by disappearance rendering, and the first image associated with the next application is then displayed by appearance rendering. It is thereby possible to make the user notice that the images have switched. It also becomes easy for the user to predict the application that will next be launched, due to the first image being moved to the center of the display 11 from the direction of the position of the first button. The "plurality of buttons" were described as icons 21 to 26 shown in FIG. 2 in the present embodiment, but these buttons may be mechanical. The "first button" is, for example, icon 22 shown in FIG. 4. "The first button being operated by the user" is, for example, the user touching icon 22 shown in FIG. 4. The "second image" is, for example, the image of a phone keypad shown in FIG. 4. The "first image" is, for example, the image of a home screen shown in FIG. 5. When an image of a phone keypad is displayed on the display 11, the screen does not change even if the user touches icon 25. In the present embodiment, a case in which the screen changes would be at the launching of an application different from the image displayed on the display 11 at the current time.

While the controller 10 is executing a rendering process, buttons are displayed on the display 11 at all times so as to be visually confirmable to the user. As shown in T=1 to T=6 in FIGS. 4 and 5, icons 21 to 26 are displayed at all times so as to be visually confirmable to the user while rendering processes including "disappearance rendering" and "appearance rendering" are being executed. This allows the user to launch a desired application without going through the home screen for selecting an application. However, icons 21 to 26 may not be displayed on the display 11 in some cases. Icons 21 to 26 need not be displayed on the display 11 when video content of TV, DVD, or the like, or front and rear images from an in-vehicle camera are displayed on the display 11.

When a button operation by the user has been detected, the controller 10 launches the application associated with that button. Applications include those that bring up an image of the home screen. The image of the home screen includes tiles for launching predetermined functions. The controller 10 prohibits the appearing effect and the disappearing effect when tile operation by the user has been detected. The processing load is thereby reduced. "Tiles" are images for launching applications. Tiles are, for example, the rectangular images shown at T=6 in FIG. 5. At T=6 there are five tiles. The user touches a tile to launch the desired application. Types of applications related to tiles include charging guidance, parking guidance, weather, and the like.

Rendering processes include enlarging an image, reducing an image, darkening an image, lightening an image, and moving an image. Such rendering makes it possible to make the user notice that the images have switched.

The time needed for appearance rendering is longer than the time needed for disappearance rendering. The time needed for appearance rendering is 0.6 seconds, as was described using FIG. 8. The time needed for disappearance rendering is 0.2 seconds as was described using FIG. 8. In the present embodiment, appearance rendering is executed after disappearance rendering. Therefore, if the time needed for appearance rendering is set to 0.6 seconds and the time needed for disappearance rendering is set to 0.6 seconds, overall time will be longer and transitions will be slower. The times are set as described above in order to overcome such situations The direction in which the image moves in disappearance rendering is the same for all images. The image of user notifications, the image of the home screen, the image of route guidance, the image of music, the image of a phone keypad, and the image of air conditioning are all faded out in the same direction. This makes disappearance rendering simple and makes appearance rendering stand out. It is thereby possible to make the user notice that the images have switched. There are no particular limitations as to the fade-out direction; one example is the direction in which the user is (leftward) as was described using FIG. 4.

A plurality of buttons are arranged on whichever of the left or right side of the display 11 is closer to the driver seat. This makes it easier for the user to operate the buttons. In the present embodiment, the buttons (icons 21 to 26) are arranged on the left side closer to the driver seat as shown in FIGS. 1 and 2.

Figure 9:
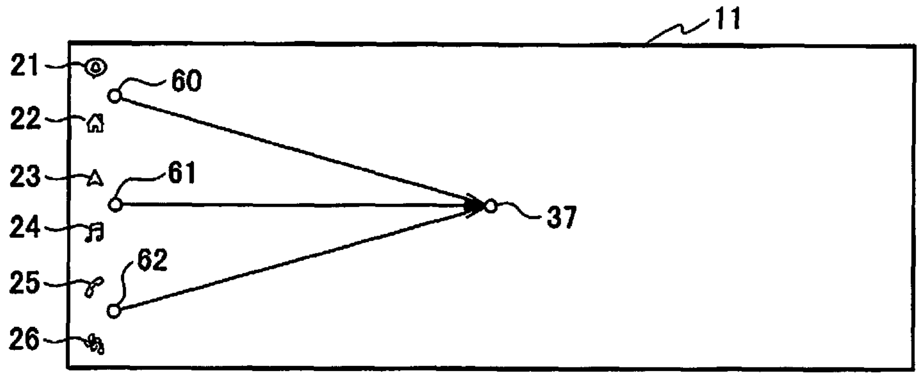
FIG. 9 is a diagram for describing a rendering process method.

Modifications shall next be described with reference to FIGS. 9 and 10. In the above embodiment, it was described that when the user touches an icon, the image associated with the touched icon appears toward the center of the display 11 from the direction of the position of the touched icon. However, this feature is not provided by way of limitation. Adjacent icons may be grouped together and images may appear from the direction of the grouped positions. In this modification, six icons shown in FIG. 9 are sorted into three groups. Specifically, the icons are sorted into an upper, middle, and lower group. Icon 21 and icon 22 are grouped together, icon 23 and icon 24 are grouped together, and icon 25 and icon 26 are grouped together.

Symbol 60 shown in FIG. 9 indicates a position between icon 21 and icon 22. Symbol 61 indicates a position between icon 23 and icon 24. Symbol 62 indicates a position between icon 25 and icon 26. Symbols 60 and 37 indicate the direction in which the image associated with icon 21 or icon 22 moves. That is, when the user touches icon 21 or icon 22, the image associated with icon 21 or icon 22 moves toward the center (symbol 37) of the display 11 from the direction (symbol 60) of the position between icon 21 and icon 22.

Similarly, symbols 61 and 37 indicate the direction in which the image associated with icon 23 or icon 24 moves. That is, when the user touches icon 23 or icon 24, the image associated with icon 23 or icon 24 moves toward the center (symbol 37) of the display 11 from the direction (symbol 61) of the position between icon 23 and icon 24. Similarly, symbols 62 and 37 indicate the direction in which the image associated with icon 25 or icon 26 moves. That is, when the user touches icon 25 or icon 26, the image associated with icon 25 or icon 26 moves toward the center (symbol 37) of the display 11 from the direction (symbol 62) of the position between icon 25 and icon 26.

Figure 10:
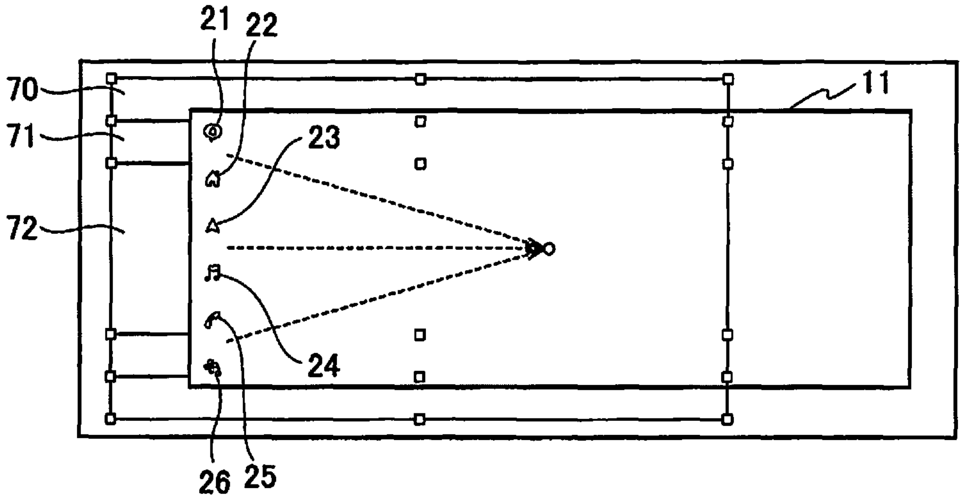
FIG. 10 is a diagram for describing a rendering process method.

In this modification, images 70 to 72 are prepared behind the display 11 as shown in FIG. 10. "Behind the display 11" is a conceptual expression. "Behind the display 11" does not mean actually behind the display 11. Image 70 is an image of notifications for the user and also an image of the home screen. Image 71 is an image of route guidance and also an image of music. Image 72 is an image of a phone keypad and also an image of air conditioning. When the upper left coordinates of images 41 to 46 shown in FIG. 6 are (x, y)=(−258, −88), (x, y)=(−258, −32), (x, y)=(−258, 28), (x, y)=(−258, 84), (x, y)=(−258, 136), and (x, y)=(−258, 190), the upper left coordinates of images 70 to 72 would be (x, y)=(−258, −60), (x, y)=(−258, 56), and (x, y)=(−258, 163). That is the position of symbol 60 is the center position between icon 21 and icon 22. The position of symbol 61 is the center position between icon 23 and icon 24. The position of symbol 62 is the center position between icon 25 and 26. However, the center position is not provided by way of limitation on the positions of symbols 60 to 62; these positions may be anywhere between grouped icons. For example, the position of symbol 60 may be the position of icon 21 or the position of icon 22. The position of symbol 61 may be the position of icon 23 or the position of icon 24. The position of symbol 62 may be the position of icon 25 or the position of icon 26.

With the display control apparatus 1 according to the modification, the following effects are obtained. Adjacent buttons among the plurality of buttons are grouped together. The controller 10 causes an image associated with the grouped buttons to move to the center of the display from the direction of the position of the grouped buttons. This reduces the processing load more so than before the buttons where grouped together. When the grouped buttons are icon 21 and icon 22, an image of notifications for the user and an image of the home screen move to the center of the display 11 from the direction of the position (symbol 60) of the grouped buttons.

The controller 10 may cause the image associated with the grouped buttons to move to the center of the display from the direction of the center position of the grouped buttons.

The functions described in the above embodiment can be implemented by using one or more processing circuits. Processing circuits include programmed processing apparatuses, such as processing apparatuses that include electrical circuits. Processing circuits also include apparatuses such as application-specific integrated circuits (ASICs) and circuit components arranged to execute the described functions.

An embodiment of the present invention was described as above, but the discussion and drawings constituting part of this disclosure should not be construed as limiting the invention. Various alternative embodiments, examples, and applicable features shall become clear to those skilled in the art from this disclosure.

FIG. 11 shows an image displayed when the user touches icon 23. The image shown in FIG. 11 shows route guidance. Symbol 80 indicates an image relating to map information. Symbol 81 indicates an image relating to information other than map information. "Information other than map information" is character information, guidance information, etc. When causing an image of route guidance to appear in the display 11, the controller 10 may prohibit appearance rendering for the image (symbol 80) relating to map information and perform appearance rendering for the image (symbol 81) relating to information other than map information. The contents depicted in the image relating to map information indicated by symbol 80 change from moment to moment in accordance with the position of the vehicle. Thus, the processing load increases when the image relating to map information is, inter alia, enlarged or reduced. Therefore, due to the controller 10 performing the above process, the processing load is reduced and it becomes possible to make the user notice that the images have switched.

The invention claimed is:

1. A display control apparatus comprising:

a display having a plurality of buttons arranged on either a left or right side of the display, whichever side is closer to a driver seat, adjacent buttons among the plurality of buttons being grouped together; and a controller that controls images displayed on the display, the controller upon detecting an operation of a first button by a user causes a transition to a first image from a second image, the first image being associated with the first button and being different from the second image, the second image being associated with a second button that had been displayed on the display before an operation was performed to change to the first image, the controller executing a rendering process during the transition, the rendering process including an appearance rendering, in which the first image is moved from the left or right side of the display where the first button is located to a center of the display from a direction of a position of the first button and in which the first image increases in size as the first image moves to the center of the display from the position of the first button until the first image substantially fills the display, and disappearance rendering, in which the second image is cleared from the display, and the appearance rendering is executed after the disappearance rendering, and the controller causing an image associated with the grouped buttons to move to the center of the display from a direction of a center position of the grouped buttons, each center position of the grouped buttons being spaced from one another.

2. The display control apparatus according to claim 1, wherein while the controller is executing the rendering process, the plurality of buttons are always displayed on the display in a state that is visible to the user.

3. The display control apparatus according to claim 1, wherein upon detecting an operation of at least one button of the plurality of buttons by the user, the controller starts an application associated with the at least one button that was operated, the application includes launching an image of a home screen, the image of the home screen includes a tile for launching a predetermined function, and the controller prohibits the appearance rendering and the disappearance rendering upon detecting that the tile has been operated by the user.

4. The display control apparatus according to claim 3, wherein the application includes activating a route guidance, and when the controller causes an image of the route guidance to appear in the display, the controller prohibits the appearance rendering for an image relating to map information and performs the appearance rendering for an image relating to information other than the map information.

5. The display control apparatus according to claim 1, wherein the rendering process includes enlarging an image, reducing an image, darkening an image, lightening an image, and moving an image.

6. The display control apparatus according to claim 1, wherein a time needed for the appearance rendering is longer than a time needed for the disappearance rendering.

7. The display control apparatus according to claim 1, wherein the direction in which at least one image moves during the disappearance rendering is same for all images.

8. The display control apparatus according to claim 1, wherein the plurality of buttons are a plurality of virtual icons.

9. The display control apparatus according to claim 1, wherein the adjacent buttons among the plurality of buttons are grouped together into a plurality of groups, and an image associated with one of the plurality of groups to which the adjacent buttons belong moves to the center of the display from a center position of the one of the plurality of groups.

10. The display control apparatus according to claim 1, wherein the plurality of buttons do not move on the display.

11. A display control method for a display control apparatus comprising a display having a plurality of buttons, and a controller that controls images displayed on the display, the display control method comprising:

the controller causing a transition to a first image from a second image upon detecting an operation of a first button by a user, the first image being associated with the first button and being different from the second image, the second image being associated with a second button that had been displayed on the display before an operation was performed to change to the first image, the plurality of buttons being arranged on either a left or right side of the display, whichever side is closer to a driver seat;

the controller executing a rendering process during the transition, the rendering process including an appearance rendering, in which the first image is moved from the left or right side of the display where the first button is located to a center of the display from a direction of a position of the first button and in which the first image increases in size as the first image moves to the center of the display from the position of the first button until the first image substantially fills the display, and disappearance rendering, in which the second image is cleared from the display;

the controller executing the appearance rendering after the disappearance rendering;

adjacent buttons among the plurality of buttons being grouped together, the controller causing an image associated with the grouped buttons to move to the center of the display from a direction of a center position of the grouped buttons, each center position of the grouped buttons being spaced from one another.

12. The display control method according to claim 11, wherein the adjacent buttons among the plurality of buttons are grouped together into a plurality of groups, and an image associated with one of the plurality of groups to which the adjacent buttons belong moves to the center of the display from a center position of the one of the plurality of groups.

13. The display control method according to claim 11, wherein the plurality of buttons do not move on the display.

14. The display control method according to claim 11, wherein while the controller is executing the rendering process, the plurality of buttons are always displayed on the display in a state that is visible to the user.

15. A display control apparatus comprising:

a display having a plurality of buttons arranged on either a left or right side of the display, whichever side is closer to a driver seat; and a controller that controls images displayed on the display, the controller upon detecting an operation of a first button by a user causes a transition to a first image from a second image, the first image being associated with the first button and being different from the second image, the second image being associated with a second button that had been displayed on the display before an operation was performed to change to the first image, the controller executing a rendering process during the transition, the rendering process including an appearance rendering, in which the first image is moved from the left or right side of the display where the first button is located to a center of the display from a direction of a position of the first button and in which the first image increases in size as the first image moves to the center of the display from the position of the first button until the first image substantially fills the display, and disappearance rendering, in which the second image is cleared from the display, and the appearance rendering is executed after the disappearance rendering, upon detecting an operation of at least one button of the plurality of buttons by the user, the controller starts an application associated with the at least one button that was operated, the application includes launching an image of a home screen, the image of the home screen includes a tile for launching a predetermined function, and the controller prohibits the appearance rendering and the disappearance rendering upon detecting that the tile has been operated by the user, the application further includes activating a route guidance, and when the controller causes an image of the route guidance to appear in the display, the controller prohibits the appearance rendering for an image relating to map information and performs the appearance rendering for an image relating to information other than the map information.

16. The display control apparatus according to claim 15, wherein while the controller is executing the rendering process, the plurality of buttons are always displayed on the display in a state that is visible to the user.

17. The display control apparatus according to claim 15, wherein the plurality of buttons do not move on the display.

* * * * *